United States Patent
Ikeda et al.

(10) Patent No.: US 12,072,683 B2
(45) Date of Patent: Aug. 27, 2024

(54) COMPONENTS, CONTROLLER, AND INDUSTRIAL MACHINE

(71) Applicant: FANUC CORPORATION, Yamanashi (JP)

(72) Inventors: Kazuki Ikeda, Yamanashi (JP); Takahiro Ichikawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 585 days.

(21) Appl. No.: 17/124,924

(22) Filed: Dec. 17, 2020

(65) Prior Publication Data

US 2021/0200181 A1    Jul. 1, 2021

(30) Foreign Application Priority Data

Dec. 27, 2019   (JP) .................................. 2019-238443
Nov. 11, 2020   (JP) .................................. 2020-187748

(51) Int. Cl.
*G05B 19/406*   (2006.01)
*G06F 11/30*    (2006.01)

(52) U.S. Cl.
CPC ........ *G05B 19/406* (2013.01); *G06F 11/3051* (2013.01); *G05B 2219/49001* (2013.01)

(58) Field of Classification Search
CPC ........ G05B 19/406; G05B 2219/49001; G06F 11/3051
See application file for complete search history.

(56) References Cited

U.S. PATENT DOCUMENTS

| | | | |
|---|---|---|---|
| 2004/0153786 A1* | 8/2004 | Johnson | G06F 11/3055 714/E11.2 |
| 2008/0228347 A1* | 9/2008 | Craik | G06Q 10/10 701/31.4 |
| 2010/0185903 A1* | 7/2010 | Horn | G06F 11/004 706/47 |

(Continued)

FOREIGN PATENT DOCUMENTS

| | | |
|---|---|---|
| JP | 2002-258941 A | 9/2002 |
| JP | 2004-133741 A | 4/2004 |

(Continued)

*Primary Examiner* — Zachary K Huson
(74) *Attorney, Agent, or Firm* — Studebaker & Brackett PC

(57) ABSTRACT

Components are assembled in an industrial machine together with a controller. The components each include a unique identification information memory portion and a component-side configuration history memory portion. The unique identification information memory portion stores, as unique identification information, identification information of the component itself, which is providable to the controller. The component-side configuration history memory portion stores configuration histories that each summarize, in terms of an acquisition timing from the controller, the unique identification information of the component itself, controller identification information of the controller that was used to configure the industrial machine together with the component itself, and unique identification information of other ones, than the controller, of the components, which were also used to configure the industrial machine together with the component itself.

22 Claims, 15 Drawing Sheets

(56) References Cited

U.S. PATENT DOCUMENTS

| | | | |
|---|---|---|---|
| 2015/0120008 A1* | 4/2015 | Hashimoto | G06Q 10/06 700/1 |
| 2017/0235622 A1* | 8/2017 | Boyapalle | G06F 11/3065 714/47.2 |
| 2018/0164757 A1* | 6/2018 | Matsushima | G05B 13/027 |
| 2021/0181720 A1* | 6/2021 | Ratilla | G05B 19/0426 |

FOREIGN PATENT DOCUMENTS

| | | |
|---|---|---|
| JP | 2005-202774 A | 7/2005 |
| JP | 2012-226662 A | 11/2012 |
| JP | 2021-005231 A | 1/2021 |

\* cited by examiner

FIG. 3

LIST OF COMPONENTS (RECORDED DATE AND TIME: ○○ (HOURS): △△ (MINUTES): □□ (SECONDS), yy (DAY), xx (MONTH))

1: CNC—INDIVIDUAL IDENTIFICATION NUMBER—TYPE
2: SERVO AMPLIFIER—INDIVIDUAL IDENTIFICATION NUMBER—TYPE
 3: SOFTWARE SERIES AND VERSION NUMBER
 3: MAXIMUM ALLOWABLE CURRENT VALUE
 3: SERVO MOTOR—INDIVIDUAL IDENTIFICATION NUMBER—TYPE
  4: PULSE CODER—INDIVIDUAL IDENTIFICATION NUMBER—TYPE
  4: ORIGIN OF PULSE CODER
2: SPINDLE AMPLIFIER—INDIVIDUAL IDENTIFICATION NUMBER—TYPE
 3: SPINDLE MOTOR—INDIVIDUAL IDENTIFICATION NUMBER—TYPE
2: SENSOR—INDIVIDUAL IDENTIFICATION NUMBER—TYPE

FIG. 8

```
LIST OF COMPONENTS
(RECORDED DATE AND TIME: ○○ (HOURS): △△ (MINUTES): □□ (SECONDS), yy (DAY), xx (MONTH))

CNC                 —INDIVIDUAL IDENTIFICATION NUMBER—TYPE
SERVO AMPLIFIER     —INDIVIDUAL IDENTIFICATION NUMBER—TYPE
AMPLIFIER SOFTWARE— —TYPE—SERIES AND VERSION NUMBER
SERVO MOTOR         —INDIVIDUAL IDENTIFICATION NUMBER—TYPE
PULSE CODER         —INDIVIDUAL IDENTIFICATION NUMBER—TYPE—ORIGIN
SPINDLE AMPLIFIER   —INDIVIDUAL IDENTIFICATION NUMBER—TYPE
SPINDLE MOTOR       —INDIVIDUAL IDENTIFICATION NUMBER—TYPE
SENSOR              —INDIVIDUAL IDENTIFICATION NUMBER—TYPE
```

FIG. 9

```
LIST OF COMPONENTS
(RECORDED DATE AND TIME: ○○ (HOURS): △△ (MINUTES): □□ (SECONDS), yy (DAY), xx (MONTH))

CNC                    —INDIVIDUAL IDENTIFICATION NUMBER —TYPE
 —SERVO AMPLIFIER      —INDIVIDUAL IDENTIFICATION NUMBER —TYPE
 —SPINDLE AMPLIFIER    —INDIVIDUAL IDENTIFICATION NUMBER —TYPE
 —SENSOR               —INDIVIDUAL IDENTIFICATION NUMBER —TYPE

SERVO AMPLIFIER        —INDIVIDUAL IDENTIFICATION NUMBER —TYPE
 —CNC                  —INDIVIDUAL IDENTIFICATION NUMBER —TYPE
 —AMPLIFIER SOFTWARE—                                    —TYPE—SERIES AND VERSION NUMBER
 —SERVO MOTOR          —INDIVIDUAL IDENTIFICATION NUMBER —TYPE

SERVO MOTOR            —INDIVIDUAL IDENTIFICATION NUMBER —TYPE
 —SERVO AMPLIFIER      —INDIVIDUAL IDENTIFICATION NUMBER —TYPE
 —PULSE CODER          —INDIVIDUAL IDENTIFICATION NUMBER —TYPE—ORIGIN
```

FIG. 10

LIST OF COMPONENTS

RECORDED DATE AND TIME: ○○ (HOURS): △△ (MINUTES): □□ (SECONDS), yy (DAY), xx (MONTH)
CNC — INDIVIDUAL IDENTIFICATION NUMBER — TYPE
SERVO AMPLIFIER — INDIVIDUAL IDENTIFICATION NUMBER — TYPE
SERVO MOTOR — INDIVIDUAL IDENTIFICATION NUMBER — TYPE
PULSE CODER — INDIVIDUAL IDENTIFICATION NUMBER — TYPE

RECORDED DATE AND TIME: ○○ (HOURS): △△ (MINUTES): □□ (SECONDS), yy (DAY), xx (MONTH)
− SERVO AMPLIFIER — INDIVIDUAL IDENTIFICATION NUMBER — TYPE
+ SERVO AMPLIFIER — INDIVIDUAL IDENTIFICATION NUMBER — TYPE

RECORDED DATE AND TIME: ○○ (HOURS): △△ (MINUTES): □□ (SECONDS), yy (DAY), xx (MONTH)
+ SENSOR — INDIVIDUAL IDENTIFICATION NUMBER — TYPE

FIG. 13A

LIST OF COMPONENTS

RECORDED DATE AND TIME: ○○ (HOURS): △△ (MINUTES): □□ (SECONDS), yy (DAY), xx (MONTH)
CNC  MAIN PCB           —INDIVIDUAL IDENTIFICATION NUMBER—TYPE
CNC  CPU PCB            —INDIVIDUAL IDENTIFICATION NUMBER—TYPE
CNC  MEMORY PCB         —INDIVIDUAL IDENTIFICATION NUMBER—TYPE
CNC  COMMUNICATION PCB  —INDIVIDUAL IDENTIFICATION NUMBER—TYPE
CNC  POWER SUPPLY PCB   —INDIVIDUAL IDENTIFICATION NUMBER—TYPE
CNC  BACK PANEL PCB     —INDIVIDUAL IDENTIFICATION NUMBER—TYPE
CNC  ADDITIONAL FUNCTION PCB—INDIVIDUAL IDENTIFICATION NUMBER—TYPE
CNC  CNC SOFTWARE A     —            —TYPE—SERIES AND VERSION NUMBER
CNC  CNC SOFTWARE B     —            —TYPE—SERIES AND VERSION NUMBER
CNC  PARAMETER          —

FIG. 13B

```
─Interface1─
SERVO AMPLIFIER #1                  — INDIVIDUAL IDENTIFICATION NUMBER — TYPE
SERVO AMPLIFIER #1 IF PCB           — INDIVIDUAL IDENTIFICATION NUMBER — TYPE
SERVO AMPLIFIER #1 DRIVE PCB        — INDIVIDUAL IDENTIFICATION NUMBER — TYPE
  └PULSE CODER PC PCB               — INDIVIDUAL IDENTIFICATION NUMBER — TYPE
  └SERVO MOTOR                      — INDIVIDUAL IDENTIFICATION NUMBER — TYPE
SERVO AMPLIFIER #2                  — INDIVIDUAL IDENTIFICATION NUMBER — TYPE
SERVO AMPLIFIER #2 IF PCB           — INDIVIDUAL IDENTIFICATION NUMBER — TYPE
SERVO AMPLIFIER #2 DRIVE PCB        — INDIVIDUAL IDENTIFICATION NUMBER — TYPE
  └PULSE CODER PC PCB               — INDIVIDUAL IDENTIFICATION NUMBER — TYPE
  └SERVO MOTOR                      — INDIVIDUAL IDENTIFICATION NUMBER — TYPE
─Interface2─                                                          — TYPE
SERVO AMPLIFIER #3                  — INDIVIDUAL IDENTIFICATION NUMBER — TYPE
SERVO AMPLIFIER #3 IF PCB           — INDIVIDUAL IDENTIFICATION NUMBER — TYPE
SERVO AMPLIFIER #3 DRIVE PCB        — INDIVIDUAL IDENTIFICATION NUMBER — TYPE
  └PULSE CODER PC PCB               — INDIVIDUAL IDENTIFICATION NUMBER — TYPE
  └SERVO MOTOR                      — INDIVIDUAL IDENTIFICATION NUMBER — TYPE
SPINDLE AMPLIFIER                   — INDIVIDUAL IDENTIFICATION NUMBER — TYPE
SPINDLE AMPLIFIER IF PCB            — INDIVIDUAL IDENTIFICATION NUMBER — TYPE
SPINDLE AMPLIFIER SOFTWARE                                            — TYPE — SERIES AND VERSION NUMBER
SPINDLE AMPLIFIER DRIVE PCB         — INDIVIDUAL IDENTIFICATION NUMBER — TYPE
  └SPINDLE SENSOR SENSOR PCB        — INDIVIDUAL IDENTIFICATION NUMBER — TYPE
```

FIG. 13C

---Interface3---
I/O I/O PCB — INDIVIDUAL IDENTIFICATION NUMBER—TYPE
SENSOR SENSOR PCB — INDIVIDUAL IDENTIFICATION NUMBER—TYPE RECORDED DATE AND TIME: ○○ (HOURS): △△ (MINUTES): □□ (SECONDS), yy (DAY), xx (MONTH)
---Interface1---
—SERVO AMPLIFIER #1 DRIVE PCB— INDIVIDUAL IDENTIFICATION NUMBER—TYPE
+SERVO AMPLIFIER #1 DRIVE PCB— INDIVIDUAL IDENTIFICATION NUMBER—TYPE RECORDED DATE AND TIME: ○○ (HOURS): △△ (MINUTES): □□ (SECONDS), yy (DAY), xx (MONTH)
—CNC      CNC SOFTWARE A    —            —TYPE — SERIES AND VERSION NUMBER
+CNC      CNC SOFTWARE A    —            —TYPE — SERIES AND VERSION NUMBER RECORDED DATE AND TIME: ○○ (HOURS): △△ (MINUTES): □□ (SECONDS), yy (DAY), xx (MONTH)
---Interface3---
+SENSOR — INDIVIDUAL IDENTIFICATION NUMBER—TYPE

COMPONENTS, CONTROLLER, AND INDUSTRIAL MACHINE

This application is based on and claims the benefit of priority from Japanese Patent Application Nos. 2019-238443 and 2020-187748, respectively filed on Dec. 27, 2019, and Nov. 11, 2020, the contents of which are incorporated herein by reference.

BACKGROUND OF THE INVENTION

Field of the Invention

The present disclosure relates to components, a controller, and an industrial machine.

Related Art

Conventionally, an industrial machine that machines a workpiece, for example, and a controller that controls the industrial machine have been known. The industrial machine is assembled with a plurality of components, such as an amplifier and a motor. Commonly, the controller and the components as described above are each only recorded with its own individual identification number. Currently, a combination of the controller and the components is recorded on a database at the time of shipping from a manufacturer.

After a system has been shipped, the system may sometimes undergo a change in configuration due to a requirement by a machine tool builder to which the system has been shipped or due to an end user having exchanged or repaired a part, for example. If an abnormality occurs in a component of the system as described above, the component is then collected and investigated. However, even though the abnormality has occurred after the change in the system, information of the system configuration at the time the abnormality has occurred is not available. Therefore, it is impossible to perform a test to accurately reproduce the abnormality. As a result, the occurrence of the abnormality may not be confirmed, making it impossible to solve the abnormality. To this end, a mechanism for setting a configuration of a monitoring control system has been proposed. The mechanism allows a monitoring control unit coupled to an external unit to share registration information of the external unit (for example, see Japanese Unexamined Patent Application, Publication No. 2004-133741).

Patent Document 1: Japanese Unexamined Patent Application, Publication No. 2004-133741

SUMMARY OF THE INVENTION

In the mechanism described in Japanese Unexamined Patent Application, Publication No. 2004-133741, a monitoring control unit is coupled to an external unit to share registration information of the external unit. On the other hand, in the mechanism described in Japanese Unexamined Patent Application, Publication No. 2004-133741, even though the unique registration information is shared, past registration information is not shared. Therefore, even if a system configuration is changed after an abnormality has occurred, the configuration at the time the abnormality had occurred is not recorded. Therefore, the configuration at the time the abnormality had occurred may not be reproduced, making it impossible to solve the abnormality. To this end, it is preferable that a configuration at a time an abnormality has occurred may be easily acquired.

According to the first aspect, the present disclosure relates to components assembled in an industrial machine together with a controller. The components each include a unique identification information memory portion and a component-side configuration history memory portion. The unique identification information memory portion stores, as unique identification information, identification information of the component itself, which is providable to the controller. The component-side configuration history memory portion stores configuration histories that each summarize, in terms of an acquisition timing from the controller, the unique identification information of the component itself, controller identification information of the controller that was used to configure the industrial machine together with the component itself, and unique identification information of other ones of the components, which were also used to configure the industrial machine together with the component itself.

According to the second aspect, the present disclosure further relates to components assembled in an industrial machine together with a controller. The components each include a unique identification information memory portion, a component-side configuration history memory portion, a component-side difference detection portion, and a component-side storing execution portion. The unique identification information memory portion stores, as unique identification information, identification information of the component itself, which is providable to the controller. The component-side configuration history memory portion stores configuration histories that each summarize, in terms of an acquisition timing, the unique identification information of the component itself, controller identification information of the controller that was used to configure the industrial machine together with the component itself, and unique identification information of other ones of the components, which were also used to configure the industrial machine together with the component itself. The component-side difference detection portion detects whether there is a difference in the configuration between controller identification information and unique identification information included in a latest configuration history stored in the component-side configuration history memory portion and controller identification information and unique identification information included in a latest configuration history stored in the controller that controls the components. The component-side storing execution portion causes, when a difference is detected, the component-side configuration history memory portion to store a new configuration history, separately from the configuration histories that have already been stored. According to the third aspect, the present disclosure relates to a controller that controls components, and the controller includes: a controller identification information memory portion that, stores identification information of the controller itself as controller identification information; a unique identification information acquisition portion that newly acquires unique identification information of the components from each of the components as unique identification information; a control-side configuration history memory portion that stores configuration histories that each summarize, in terms of an acquisition timing, controller identification information stored in the controller identification information memory portion and unique identification information previously acquired by the unique identification information acquisition portion; and a control-side storing execution portion that summarizes controller identification information stored in the controller identification information memory portion and unique identification information newly acquired by the unique identification information acquisition portion into a new configuration history, and causes the control-side configuration history memory portion to store the new configuration history, separately from the configuration histories that have already been stored.

According to the present disclosure, it is possible to provide components, a controller for the components, and an industrial machine including the components and the controller/which each allow for an easy acquisition of a configuration history at a time when an abnormality has occurred.

BRIEF DESCRIPTION OF THE DRAWINGS

FIG. 3 is a schematic diagram showing a configuration history of the industrial machine according to the first embodiment;

FIG. 8 is a schematic diagram showing a list of components in a configuration history according to a modification example;

FIG. 9 is a schematic diagram showing a list of components in a configuration history according to another modification example;

FIG. 10 is a schematic diagram showing a list of components in a configuration history according to still another modification example;

FIG. 13A is a schematic diagram showing a configuration history of an industrial machine according to the third embodiment;

FIG. 13B is a schematic diagram showing a configuration history of the industrial machine according to the third embodiment; and FIG. 13C is a schematic diagram showing a configuration history of the industrial machine according to the third embodiment.

DETAILED DESCRIPTION OF THE INVENTION

Here, an industrial machine 1, a controller 10, and components 200 according to each embodiment of the present disclosure will be described with reference to FIGS. 1 to 7 and 11 to 13C. An outline of the industrial machine 1, the controller 10, and the components 200 according to each embodiment will first be described below.

The industrial machine 1, the controller 10, and the components 200 can each store a configuration history relating to respective parts configuring thereof, for example. Here, the plurality of components 200 are combined to configure a part or a whole, excluding the controller 10, of the industrial machine 1. Examples of the industrial machine include, for example, machine tools (including machining centers, lathes, grinders, and electrical discharge machines), industrial robots, and other machines (including injection molding machines, laser processing machines, press working machines, and additive layer manufacturing machines). The industrial machine 1, the controller 10, and the components 200 each can store a configuration history per change in configuration content, for example. Therefore, even when an abnormality has occurred in one of the components 200, and the one of the components 200 is removed from the industrial machine 1, and is allowed to undergo a test at another place, it is possible to similarly reproduce and reconfigure the industrial machine 1 in accordance with a configuration history at a time when the abnormality has occurred.

Therefore, the abnormality is reproduced at a higher rate in the test, making it possible to easily investigate and find a cause.

FIRST EMBODIMENT

Figure 1:
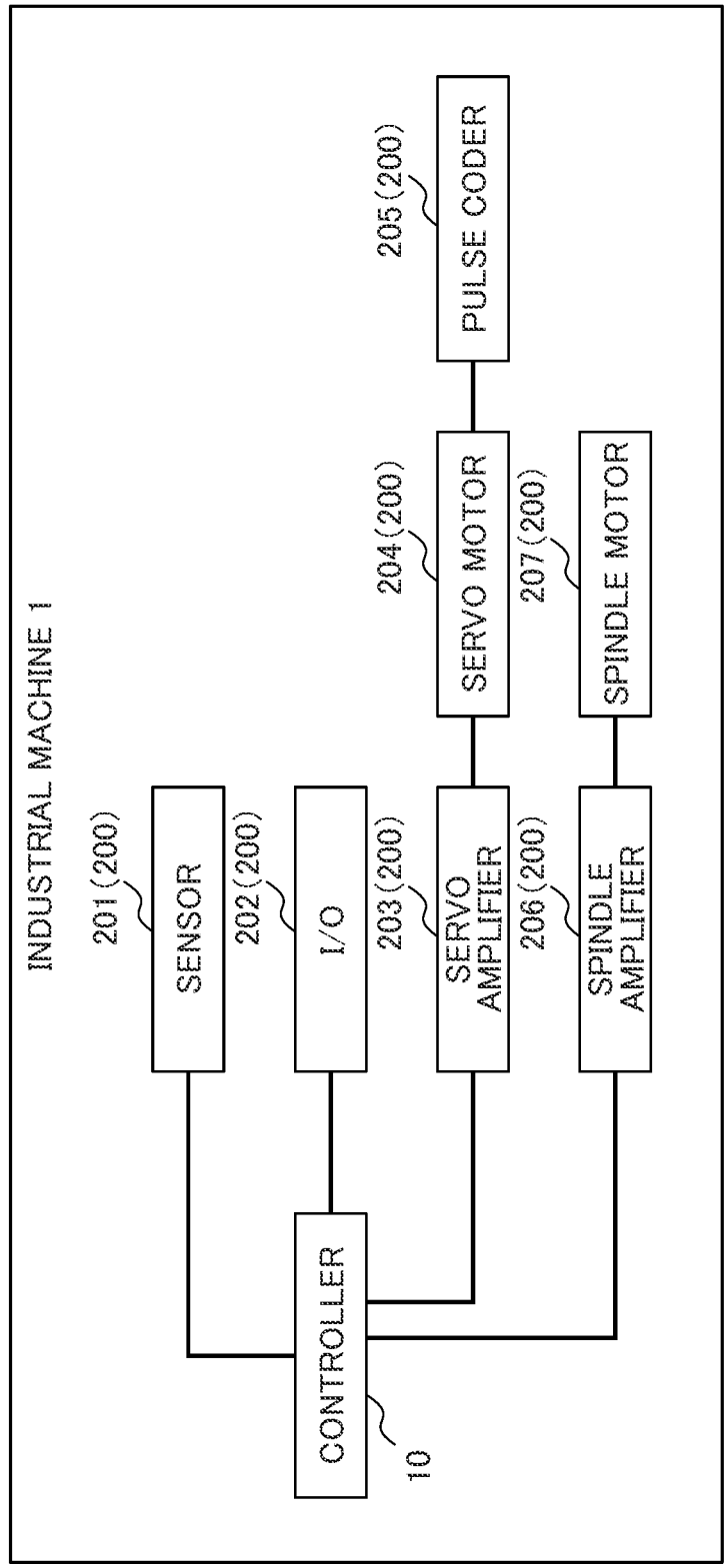
FIG. 1 is a schematic configuration diagram showing an industrial machine according to a first embodiment of the present disclosure.

The industrial machine 1 is a so-called NC (numerical control) machine tool (hereinafter, may also be referred to as "CNC" (computerized numerical control). The industrial machine 1 includes, as illustrated in FIG. 1, the controller 10, and the components 200.

The industrial machine 1 includes the plurality of components 200 that are replaceable. That is, the plurality of components 200 are combined to configure the industrial machine 1. For example, the components 200, such as a sensor 201, an I/O (input/output) 202, a servo amplifier 203, a servo motor 204, a pulse coder 205, a spindle amplifier 206, and a spindle motor 207, are combined to configure the industrial machine 1. Configurations of the components 200 will be described later.

Figure 2:
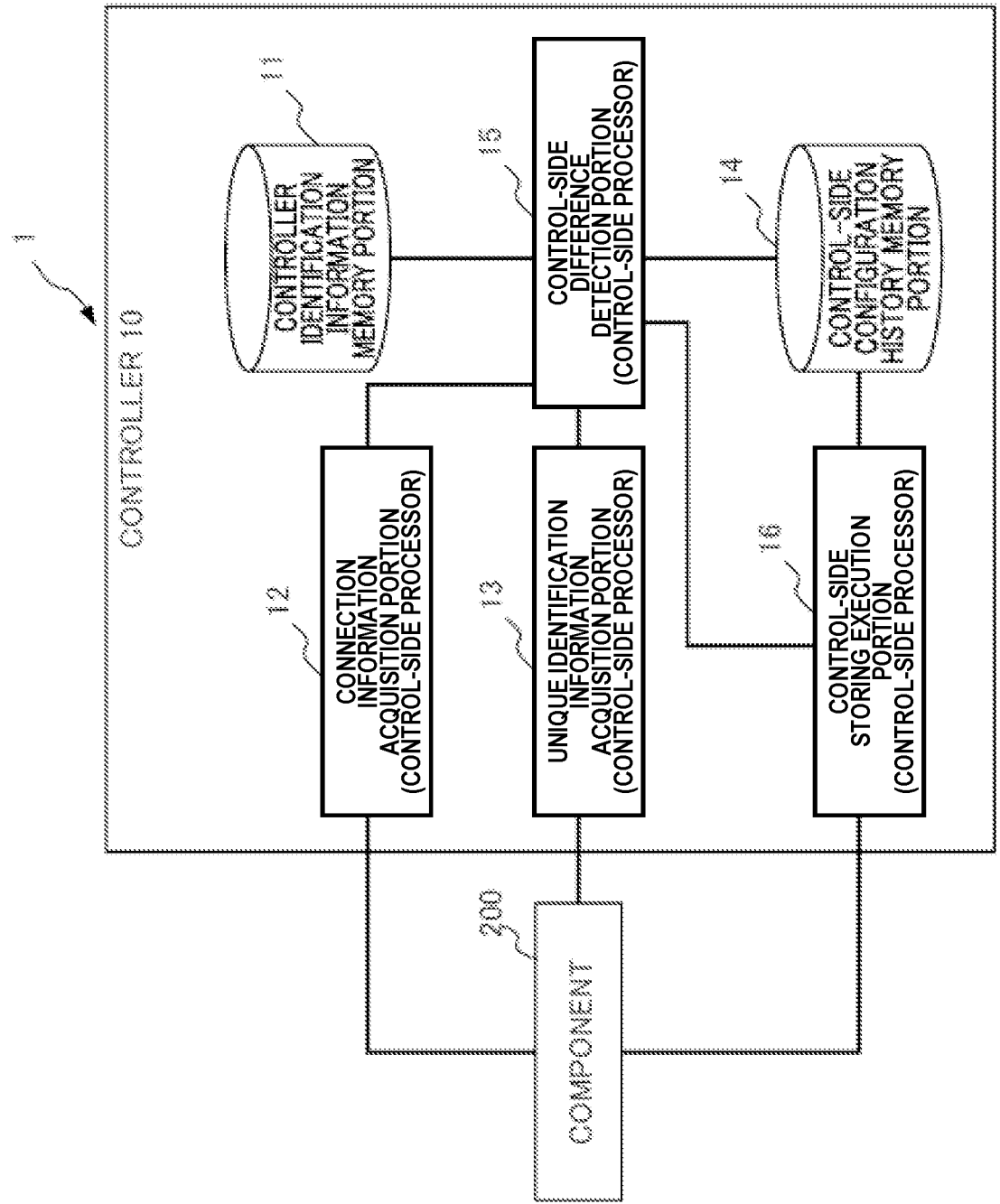
FIG. 2 is a block diagram showing a configuration of a controller according to the first embodiment.

The controller 10 represents a device that controls the components 200, for example. The controller 10 includes, as illustrated in FIG. 2, a controller identification information memory portion 11, a connection information acquisition portion 12, a unique identification information acquisition portion 13, a control-side configuration history memory portion 14, a control-side difference detection portion 15, and a control-side storing execution portion 16.

The controller identification information memory portion 11 is, for example, a secondary memory medium such as a ROM (read only memory), a flash memory, or a hard disk. The controller identification information memory portion 11 stores, as controller identification information, identification information of the controller 10 itself. The controller identification information memory portion 11 stores, as the controller identification information, an individual identification number and a type of the controller 10, for example.

The connection information acquisition portion 12 is achieved, as a CPU (central processing unit) operates, for example. The connection information acquisition portion 12 acquires connection information relating to a connection state among the controller 10 and the components 200.

The unique identification information acquisition portion 13 is achieved by operating the CPU, for example. The unique identification information acquisition portion 13 newly acquires identification information that is unique to the components 200, as unique identification information, from the components 200. The unique identification information acquisition portion 13 acquires an individual identification number and a model type of each of the components 200, for example. When one of the components 200 represents the servo amplifier 203, the unique identification information acquisition portion 13 acquires, as unique identification information, a software series and a version number, and a maximum allowable current value for the servo amplifier 203, for example.

The control-side configuration history memory portion 14 is, for example, a secondary memory medium such as a ROM, a flash memory, or a hard disk. The control-side configuration history memory portion 14 stores configuration histories that each summarize, in terms of an acquisition timing, previously acquired unique identification information. The control-side configuration history memory portion 14 stores, as configuration histories, for example, unique identification information previously acquired before unique identification information is acquired by the unique identification information acquisition portion 13. That is, the control-side configuration history memory portion 14 cumulatively stores a transition of configuration histories. The control-side configuration history memory portion 14 stores, as a single configuration history, as illustrated in FIG. 3, for example, a recorded time and date, the unique identification information of the controller 10, and a list of the components 200. The list includes unique identification information of the components 200. The control-side configuration history memory portion 14 stores, for example, as a configuration history, the controller identification information of the controller 10 and the unique identification information of the components 200.

The control-side difference detection portion 15 is achieved, by operating the CPU, for example. The control-side difference detection portion 15 detects whether there is a difference in the configuration between unique identification information and a unique configuration history. The control-side difference detection portion 15 detects, for example, whether there is a change in the unique identification information, from the unique configuration history. That is, the control-side difference detection portion 15 detects, from the unique configuration history, whether one of the components 200 has been exchanged or recombined, or software has been updated, for example.

The control-side storing execution portion 16 is achieved, by operating the CPU, for example. The control-side storing execution portion 16 summarizes, when a difference is detected the controller identification information and newly acquired unique identification information into a new configuration history. The control-side storing execution portion 16 then causes the control-side configuration history memory portion 14 to store the new configuration history, separately from the configuration histories that have already been stored. The control-side storing execution portion 16 causes the control-side configuration history memory portion 14 to store, as a new configuration history, for example, a date and time of change (a date and time of executing storing), the controller identification information, and a list of the unique identification information. The control-side storing execution portion 16 further causes the control-side configuration history memory portion 14 to store a new configuration history including the acquired connection information. The control-side storing execution portion 16 further causes the control-side configuration history memory portion 14 to store a new configuration history that indicates (in alphanumeric characters, for example), as illustrated in FIG. 3, for example, a connection relationship among the components 200. Note that, in the embodiment, when the control-side storing execution portion 16 causes the control-side configuration history memory portion 14 to store a new configuration history the control-side storing execution portion 16 further causes a component-side configuration history memory portion 212 (see FIG. 4), which will be described later, to store the new configuration history, separately from the configuration histories that have already been stored.

Figure 4:
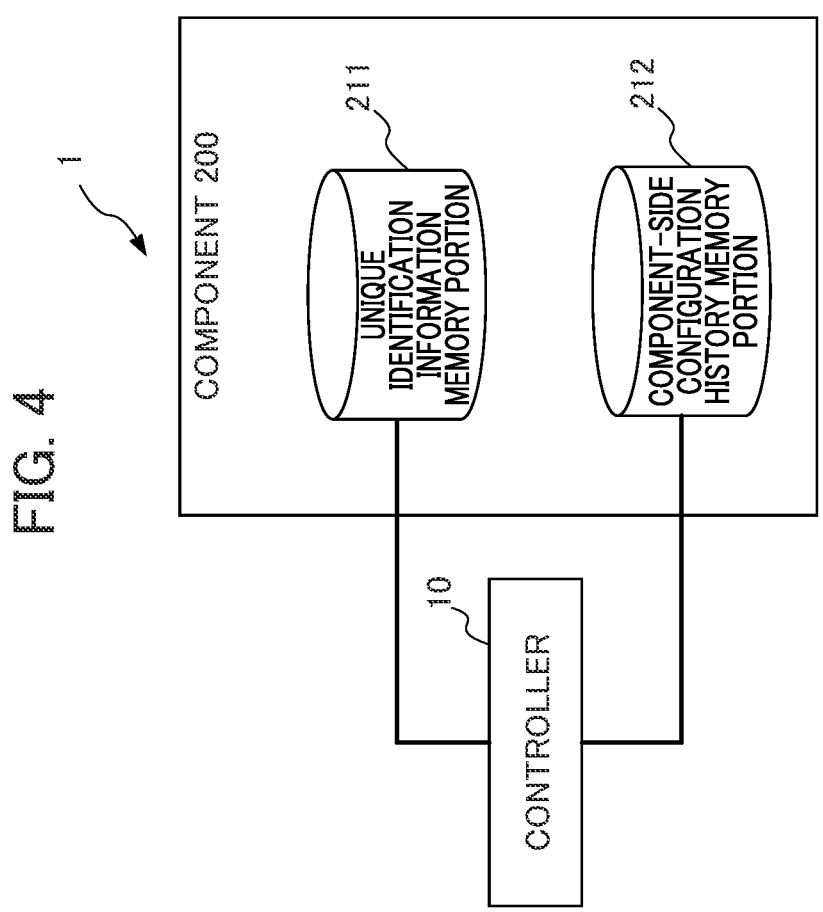
FIG. 4 is a block diagram showing a configuration of a component according to the first embodiment.

The components 200 represent parts that are each able to store configuration histories with respect to the controller 10 and the industrial machine 1 including the components 200 themselves assembled therein. The components 200 each include, as illustrated in FIG. 4, a unique identification information memory portion 211 and the component-side configuration history memory portion 212.

The unique identification information memory portion 211 is, for example, a secondary memory medium such as a ROM, a flash memory, or a hard disk. The unique identification information memory portion 211 stores, as unique identification information, identification information of the component 200 itself. The unique identification information memory portion 211 stores, for example, an individual, identification number and a specification number. The unique identification information memory portion 211 further stores unique identification information that includes information of software applied to the component 200 itself. The unique identification information memory portion 211 stores unique identification information that includes information (a series and a version number) of software applied to the servo amplifier 203, for example.

The component-side configuration history memory portion 212 is, for example, a secondary memory medium such as a ROM, a flash memory, or a hard disk. The component-side configuration history memory portion 212 stores configuration histories that each summarize, in terms of an acquisition timing, the controller identification information of the controller 10 and unique identification information of other ones of the components 200, which were also used to configure the industrial machine 1 together with the component 200 itself. The component-side configuration history memory portion 212 stores, as a configuration history, for example, the unique identification information of the component 200 itself, the controller identification information of the controller 10, and the unique identification information of the other ones of the components 200. The component-side configuration history memory portion 212 stores, each time there is a change in any one of the components 200 that configure the industrial machine 1, for example, a configuration history including the content of the change. For example, the component-side configuration history memory portion 212 further stores, when the component 200 itself is removed from the industrial machine 1, and then assembled in another industrial machine 1, a configuration history including unique identification information of other ones of the components 200 that configure the other industrial machine 1 together with the component 200 itself.

Figure 5:
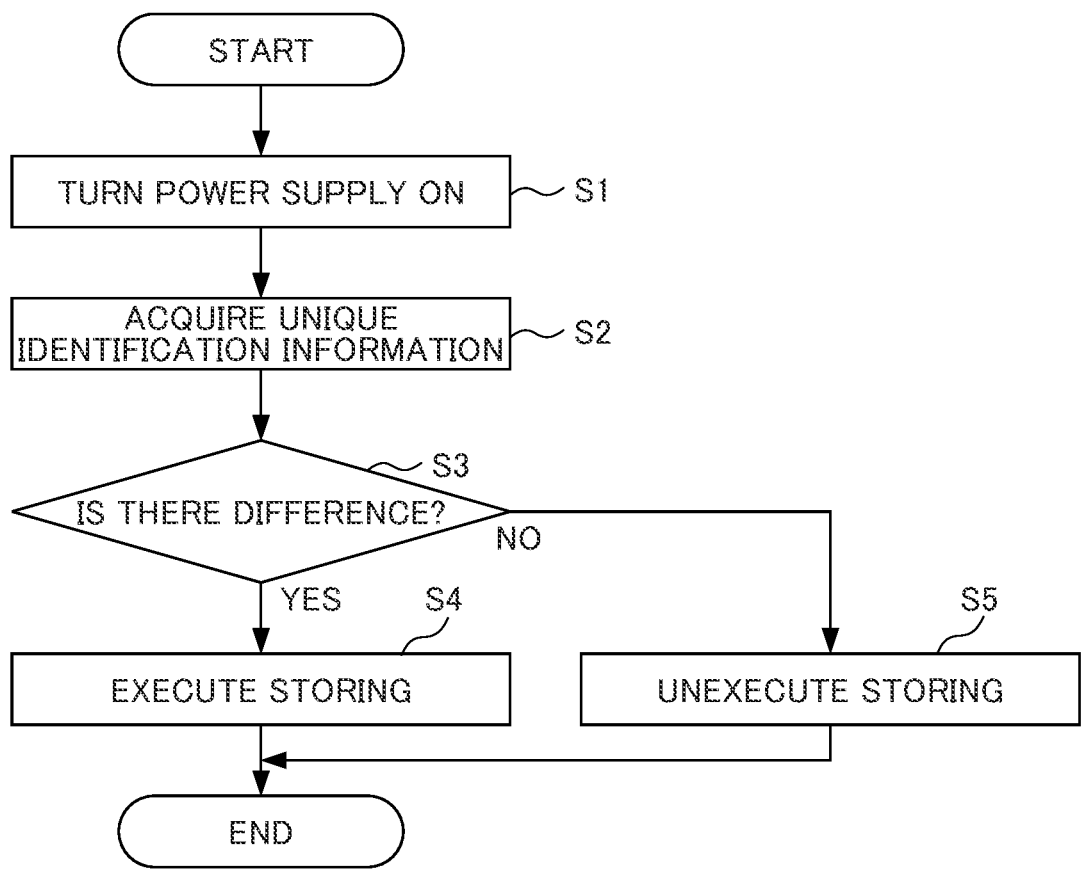
FIG. 5 is an operational flowchart of the industrial machine according to the first embodiment.

Next, an operational flow of the industrial machine 1 will be described with reference to a flowchart in FIG. 5. A power supply to the industrial machine 1 is first turned on (Step S1). That is, the power supply to the controller 10 and the components 200 is turned on. Next, the unique identification information acquisition portion 13 acquires identification information that, is unique to the components 200, as unique identification information, from the components 200 (Step S2).

Next, the control-side difference detection portion 15 detects whether there is a difference between the acquired unique identification information and a latest configuration history stored in the control-side configuration history memory portion 14 (Step S3). If there is a difference between the newly acquired unique identification information and the unique identification information included in the latest configuration history (Step S3: YES), the control-side storing execution portion 16 causes the control-side configuration history memory portion 14 and the component-side configuration history memory portion 212 to store a new configuration history including the controller identification information and the newly acquired unique identification information (Step S4). At this time, the control-side storing execution portion 16 causes the control-side configuration history memory portion 14 and the component-side configuration history memory portion 212 to store the new configuration history together with connection information acquired from the connection information acquisition portion 12. The flow then ends. On the other hand, if there is no difference between the unique identification information and the unique identification information included in the latest configuration history (Step S3: NO), the control-side storing execution portion 16 does not execute storing of the new configuration history (Step S5). The flow then ends.

The industrial machine 1, the controller 10, and the components 200 according to the first embodiment, as described above, lead to the following effects.

(1) The components 200 are assembled in the industrial machine 1 together with the controller 10. The components 200 each include the unique identification information memory portion 211 and the component-side configuration history memory portion 212. The unique identification information memory portion 211 stores, as unique identification information, identification information of the component 200 itself, which is providable to the controller 10. The component-side configuration history memory portion 212 stores configuration histories that each summarize, in terms of an acquisition timing from the controller 10, the unique identification information of the component 200 itself, controller identification information of the controller 10 that was used to configure the industrial machine 1 together with the component itself, and unique identification information of other ones of the components 200, which were also used to configure the industrial machine 1 together with the component 200 itself. The controller 10 is coupled to the components 200 described above to control the components 200. The controller 10 includes the controller identification information memory portion 11, the unique identification information acquisition portion 13, the control-side configuration history memory portion 14, the control-side difference detection portion 15, and the control-side storing execution portion 16. The controller identification information memory portion 11 stores, as controller identification information, identification information of the controller itself. The unique identification information acquisition portion 13 newly acquires identification information that is unique to the components 200, as unique identification information, from the components 200. The control-side configuration history memory portion 14 stores configuration histories that each summarize, in terms of an acquisition timing, previously acquired unique identification information. The control-side difference detection portion 15 detects whether there is a difference in the configuration between newly acquired unique identification information and the unique identification information included in each of the unique configuration histories. The control-side storing execution portion 16 summarizes, when a difference is detected, the controller identification information and the newly acquired unique identification information into a new configuration history. The control-side storing execution portion 16 then causes the control-side configuration history memory portion 14 to store the new configuration history, separately from the configuration histories that have already been stored. Therefore, when there is a change, such as when one of the components 200 is exchanged, the unique identification information of the controller 10 that configures the industrial machine 1 and the unique identification information of the components 200 that also configure the industrial machine 1 are stored as a new configuration history. Since the new configuration history is stored, in addition to the configuration histories that have already been stored, it is possible to easily acquire one of the past configuration histories. Therefore, it is also possible to easily acquire the configuration history at a time when the abnormality has occurred. It is thus possible to reproduce in an enhanced manner an environment in which the abnormality has occurred. Therefore, it is possible to accurately investigate and find a cause of the abnormality.

(2) The unique identification information memory portion 211 stores unique identification information that includes information of software applied to the component 200 itself. Therefore, it is possible to reproduce in a further enhanced manner the environment in which the abnormality has occurred. It is thus possible to accurately investigate and find a cause of the abnormality.

(3) The controller 10 further includes the connection information acquisition portion 12 that acquires connection information relating to a connection state among the controller 10 and the components 200. The control-side storing execution portion 16 causes the control-side configuration history memory portion 14 and the component-side configuration history memory portion 212 to store a new configuration history including the acquired connection information. Therefore, it is possible to reproduce the connection state. It is thus possible to accurately investigate and find a cause of the abnormality.

Figure 6:
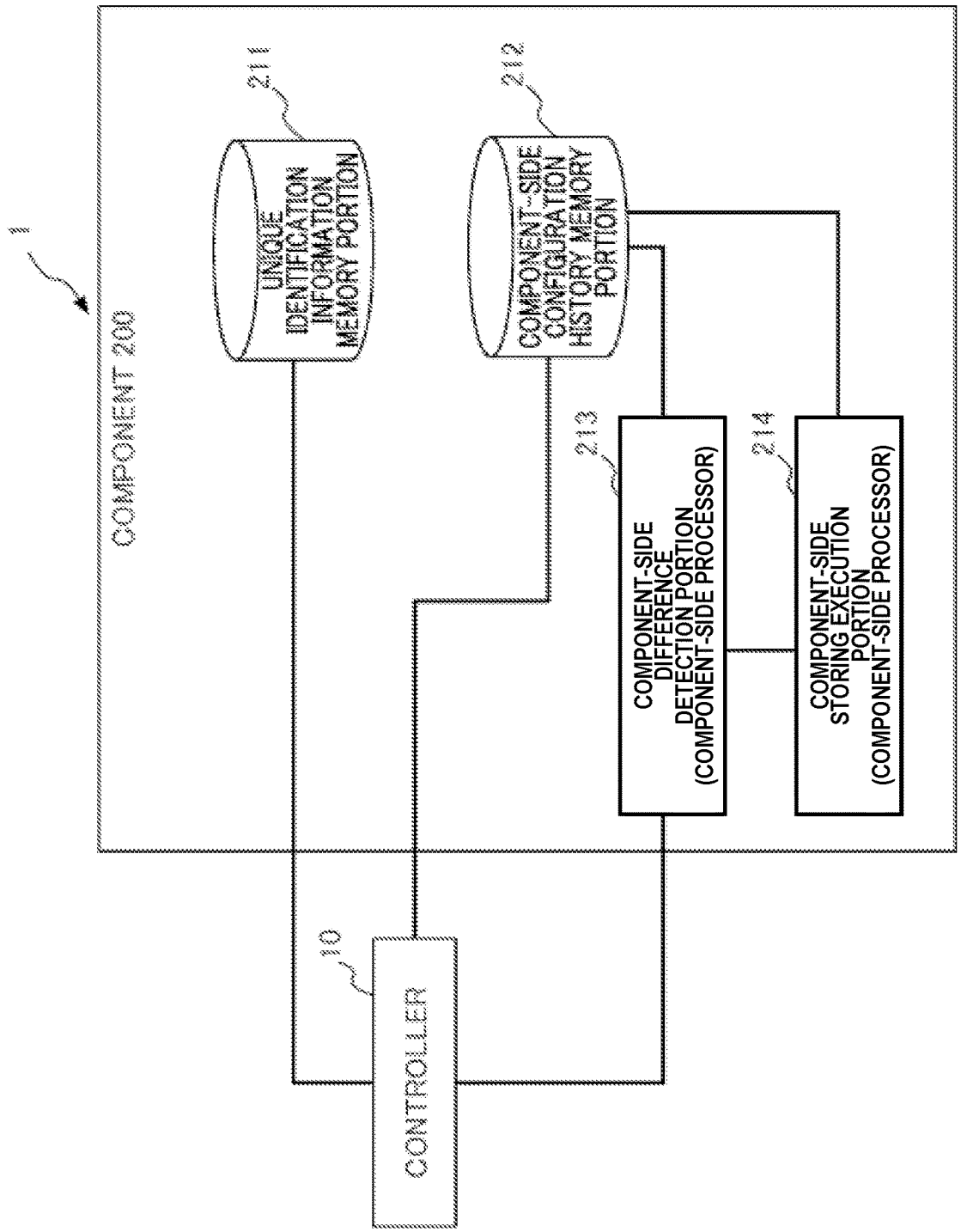
FIG. 6 is a block diagram showing a configuration of a component according to a second embodiment of the present disclosure.

Next, the industrial machine 1, the controller 10, and the components 200 according to a second embodiment of the present disclosure will be described with reference to FIG. 6. It is to be noted that, to describe the second embodiment, like reference numerals designate identical or corresponding components in the embodiment described above. The description of the components is thus omitted or simplified. In the industrial machine 1, the controller 10, and the components 200 according to the second embodiment, there is a difference, from the first, embodiment, in that the components 200 each include a component-side difference detection portion 213 and a component-side storing execution portion 214. In the industrial machine 1, the controller 10, and the components 200 according to the second embodiment, there is another difference, from the first embodiment, in that the controller 10 does not include the control-side difference detection portion 15. In the industrial machine 1, the controller 10, and the components 200 according to the second embodiment, there is still another difference, from the first embodiment, in that the control-side storing execution portion 16 does not involve detection of a difference, and the control-side configuration history memory portion 14 is caused to include acquired unique identification information in a new configuration history, and to store the new configuration history. In the industrial machine 1, the controller 10, and the components 200 according to the second embodiment, there is still another difference, from the first embodiment, in that the control-side storing execution portion 16 does not involve the operation of the component-side configuration history memory portion 212.

The component-side difference detection portion 213 is achieved, by operating the CPU, for example. The component-side difference detection portion 213 detects whether there is a difference in the configuration between a latest configuration history stored in the component-side configuration history memory portion 212 and a new configuration history stored in the control-side configuration history memory portion 14. The component-side difference detection portion 213 detects whether there is a difference between unique identification information included in the latest configuration history and unique identification information included in the new configuration history, for example.

The component-side storing execution portion 214 is achieved, by operating the CPU, for example. The component-side storing execution portion 214 causes, when a difference is detected, the control-side configuration history memory portion 14 to store the new configuration history, in addition to the configuration histories that have already been stored. That is, the component-side storing execution portion 214 causes, when a difference is detected, the component-side configuration history memory portion 212 to store the latest configuration history stored in the control-side configuration history memory portion 14, in addition to the configuration histories that have already been stored.

Figure 7:
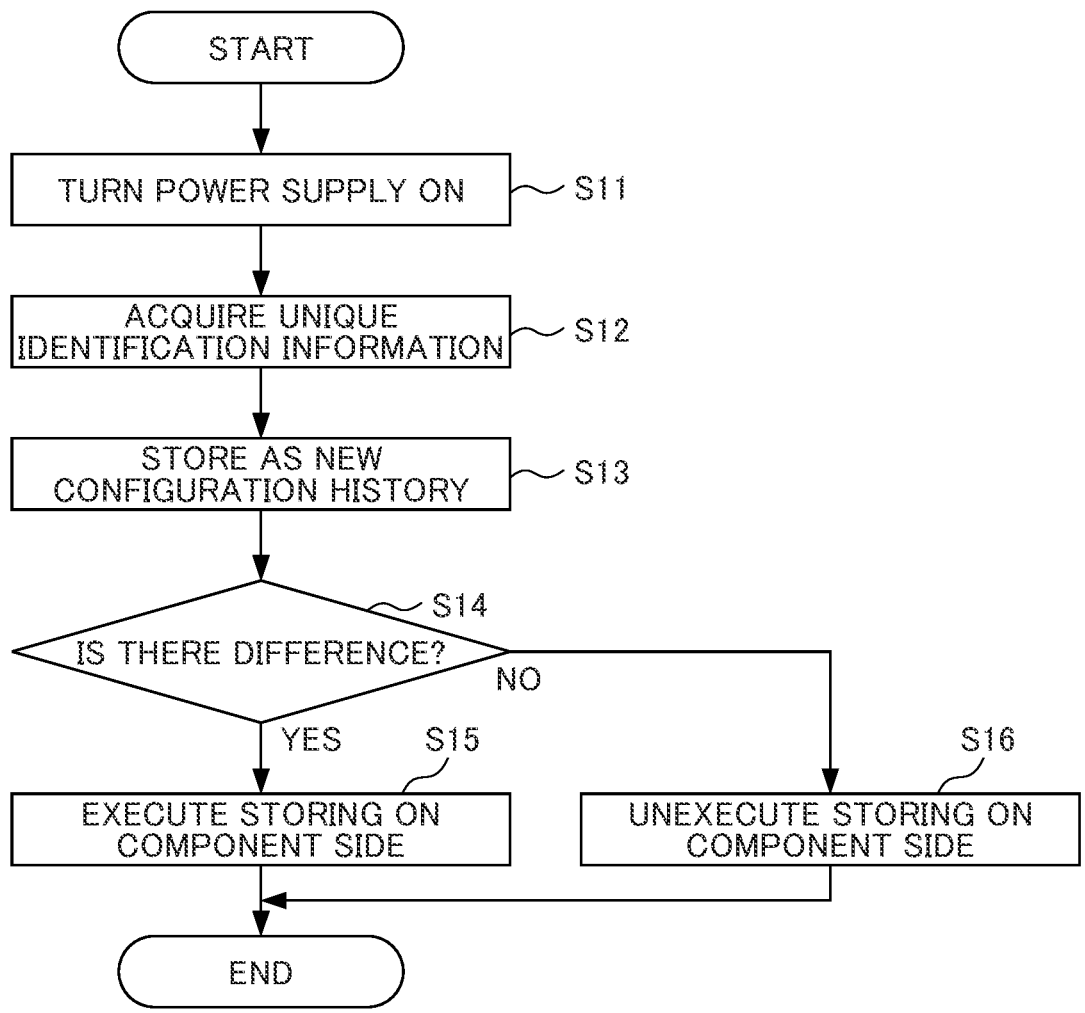
FIG. 7 is a flowchart, showing an operational, flow of an industrial machine according to the second embodiment.

Next, an operational flow of the industrial machine 1, the controller 10, and the components 200 according to the embodiment will be described with reference to FIG. 7. The power supply to the industrial machine 1 is first turned on (Step S11). That is, the power supply to the controller 10 and the components 200 is turned on. Next, the unique identification information acquisition portion 13 acquires identification information that is unique to the components 200 of the industrial machine 1, as unique identification information, from the components 200 (Step S12). The control-side storing execution portion 16 causes the control-side configuration history memory portion 14 to store a new configuration history including controller identification information and the unique identification information (Step S13).

Next, the component-side difference detection portion 213 accesses the control-side configuration history memory portion 14 and the component-side configuration history memory portion 212. The component-side difference detection portion 213 detects whether there is a difference between the new configuration history stored in the control-side configuration history memory portion 14 and a latest configuration history stored in the component-side configuration history memory portion 212 (Step S14). If there is a difference between the new configuration history and the latest configuration history (Step S14: YES), the component-side storing execution portion 214 causes the component-side configuration history memory portion 212 to store the new configuration history, separately from the configuration histories that have already been stored (Step S15). The flow then ends. On the other hand, if there is no difference between the new configuration history and the latest configuration history (Step S14: NO), the component-side storing execution portion 214 does not cause the component-side configuration history memory portion 212 to store the new configuration history (Step S16). The flow then ends.

The industrial machine 1, the controller 10, and the components 200 according to the second embodiment, as described above, lead to the following effects.

(4) The industrial machine 1 according to the second embodiment is the industrial machine 1 that includes the controller 10 and the plurality of replaceable components 200 controlled by the controller 10. The controller 10 includes the controller identification information memory portion 11, the unique identification information acquisition portion 13, the control-side configuration history memory portion 14, and the control-side storing execution portion 16. The controller identification information memory portion 11 stores, as controller identification information, identification information of the controller 10 itself. The unique identification information acquisition portion 13 newly acquires identification information that is unique to the components 200, as unique identification information, from the components 200. The control-side configuration history memory portion 14 stores configuration histories that each summarize, in terms of an acquisition timing, previously acquired unique identification information. The control-side storing execution portion 16 causes the control-side configuration history memory portion 14 to store the controller identification information and the newly acquired unique identification information, as a new configuration history, separately from the configuration histories that have already been stored. The components 200 each include the unique identification information memory portion 211, the component-side configuration history memory portion 212, the component-side difference detection portion 213, and the component-side storing execution portion 214. The unique identification information memory portion 211 stores, as unique identification information, identification information of the component 200 itself. The component-side configuration history memory portion 212 stores configuration histories that each summarize, in terms of an acquisition timing, the controller identification information of the controller 10 and the unique identification information of other ones of the components 200, which were also used to configure the industrial machine 1 together with the component 200 itself. The component-side difference detection portion 213 detects whether there is a difference in terms of configuration between the controller identification information and the unique identification information included in a unique configuration history stored in the component-side configuration history memory portion 212 and controller identification information and unique identification information included in a new configuration history stored in the control-side configuration history memory portion 14. The component-side storing execution portion 214 causes, when a difference is detected, the component-side configuration history memory portion 212 to store the new configuration history, separately from the configuration histories that have already been stored. Therefore, it is possible that the components 200 each voluntarily store a new configuration history. Therefore, it is possible to distribute and reduce burdens to the controller 10.

The industrial machine, the controller, and the components according to each of the embodiments of the present disclosure have been described above. However, the present disclosure is not limited to the embodiments described above. It is possible to appropriately change the embodiments.

For example, the first embodiment and the second embodiment described above may be appropriately combined to configure the industrial machine 1, the controller 10, and the components 200. For example, it is obviously possible to apply such a configuration so that the controller 10 includes the control-side difference detection portion 15, and the components 200 each include the component-side difference detection portion 213.

In the embodiments described above, the unique identification information acquisition portion 13 acquires unique identification information when the power supply is turned on. However, the present disclosure is not limited to the embodiments. The unique identification information acquisition portion 13 may acquire unique identification information at least at a desired timing, such as a desired time or a time set prior, or per predetermined time interval.

In the embodiments described above, the unique identification information acquisition portion 13 may acquire, via an intervening one of the components 200, the unique identification information of one of the components 200, which is not directly coupled to the controller 10. For example, the components 200 may each include a component-side unique identification information acquisition portion (not illustrated) that acquires the unique identification information of another one of the components 200, which is coupled to the component 200 itself. The component-side unique identification information acquisition portion may cause the unique identification information acquisition portion 13 to acquire the unique identification information of the component 200 itself, in addition to the unique identification information of other ones of the components 200, which are coupled to the component 200 itself.

In the embodiments described above, the components 200 may each voluntarily transmit unique identification information to the controller 10. The components 200 may each further include a unique identification information transmission portion (not illustrated) that voluntarily transmits the unique identification information of the component 200 itself.

In the embodiments described above, the controller 10 is coupled to the components 200 in a daisy-chain manner. However, the present disclosure is not limited to the embodiments. The controller 10 may be coupled to the components 200, respectively, via a bus (not illustrated). The controller 10 may be coupled to the components 200, respectively, in a wireless manner.

In the embodiments described above, the control-side configuration history memory portion 14 and the component-side configuration history memory portion 212 may each store a list of the components 200, as a configuration history, described in one of various types of description methods. The list of the components 200 may be itemized, as illustrated in FIG. 8. The list of the components 200 may indicate, as a group, components directly coupled to each other, as illustrated in FIG. 9. The list of the components 200 may include only parts where differences have been found, as illustrated in FIG. 10.

In the embodiments described above, examples of the components 200 may include a power supply, a teach pendant, and a display device. Unique identification information may include, for example, origin of pulse coder, amount of maximum allowable current of amplifier, information of axes, optional parameters, and user authentication information for security protection based on electronic key or RFID (radio frequency identification), for example.

In the embodiments described above, the unique identification information acquisition portion 13 may store unique identification information identical to the unique identification information of other ones of the components 200. The unique identification information acquisition portion 13 may store a lot number as identification information, for example. The unique identification information acquisition portion 13 may store identification information in the printed circuit board units. The unique identification information acquisition portion 13 may store identification information in terms of a composite component.

Next, an industrial machine 1, a controller 10, and components 200 according to the third embodiment of the present disclosure will be described with reference to FIGS. 11 to 13C. In the description of the third embodiment, components similar to the abovementioned embodiments are denoted with the same reference numerals, and the description therefor will be omitted or simplified. In FIGS. 11, 13A, 13B, and 13C, abbreviated names "PCB", "IE", "PC", "SP", "SOFT" respectively correspond to "printed circuit board", "interface", "pulse coder", "spindle amplifier", "spindle motor", and "software".

The industrial machine 1 according to the third embodiment differs from those of the first and second embodiments in the following points shown in FIGS. 11 to 13C. A control-side configuration history memory portion 14 stores identification information in printed circuit board (PCB) units and software units of the controller 10 and the components 200. Furthermore, as shown in FIG. 12, in the industrial machine 1 according to the third embodiment, the components 200 do not include a component-side configuration history memory portion 212, and a control-side configuration history memory portion 14 stores unique identification information of both the controller 10 and the components 200. Furthermore, as shown in FIG. 11, the controller 10 includes three interfaces (IF1=interface 1, IF2=interface 2, and IF3=interface 3).

Figure 11:
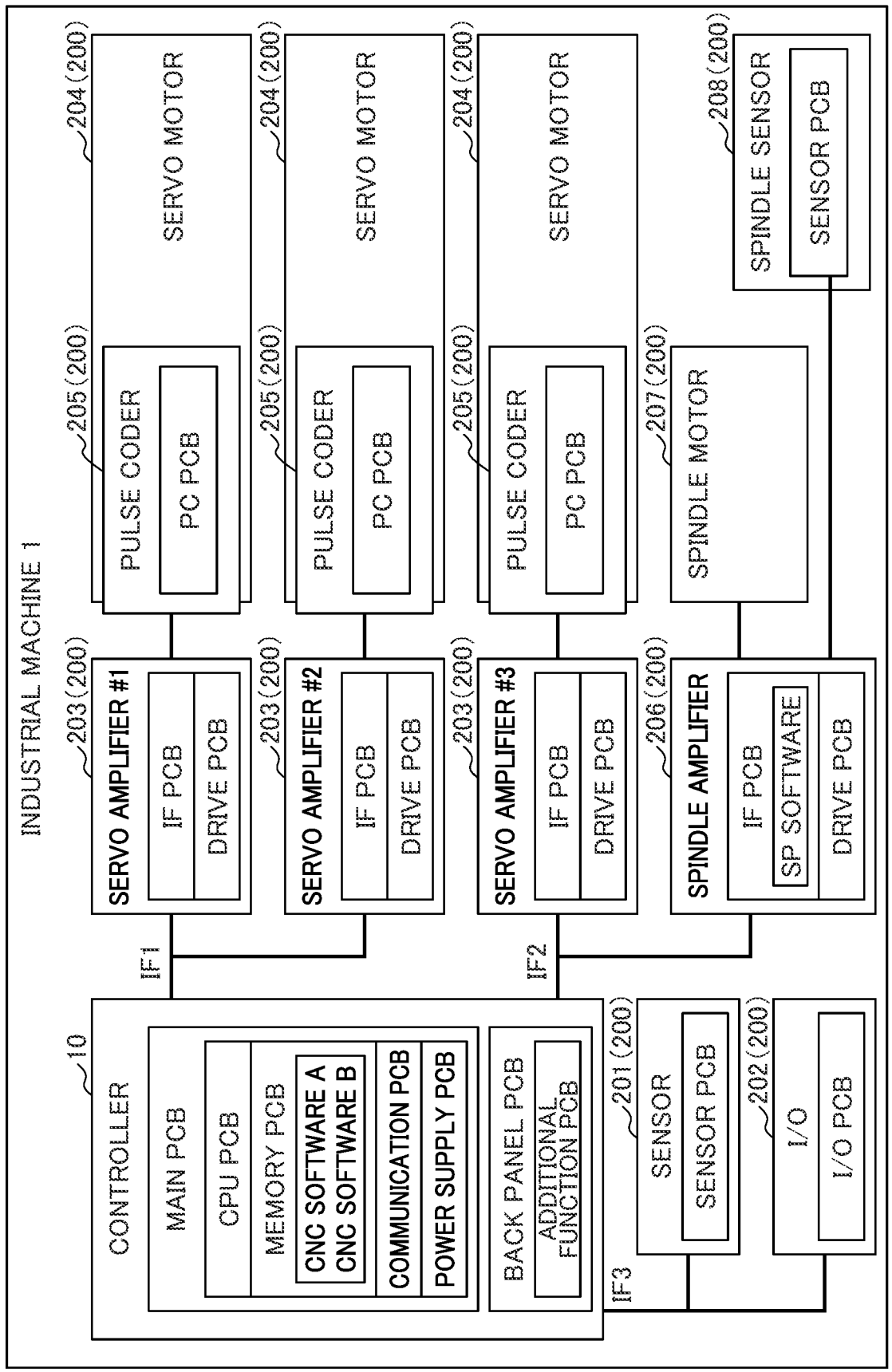
FIG. 11 is a schematic configuration diagram showing an industrial machine according to a third embodiment of the present disclosure.
Figure 12:
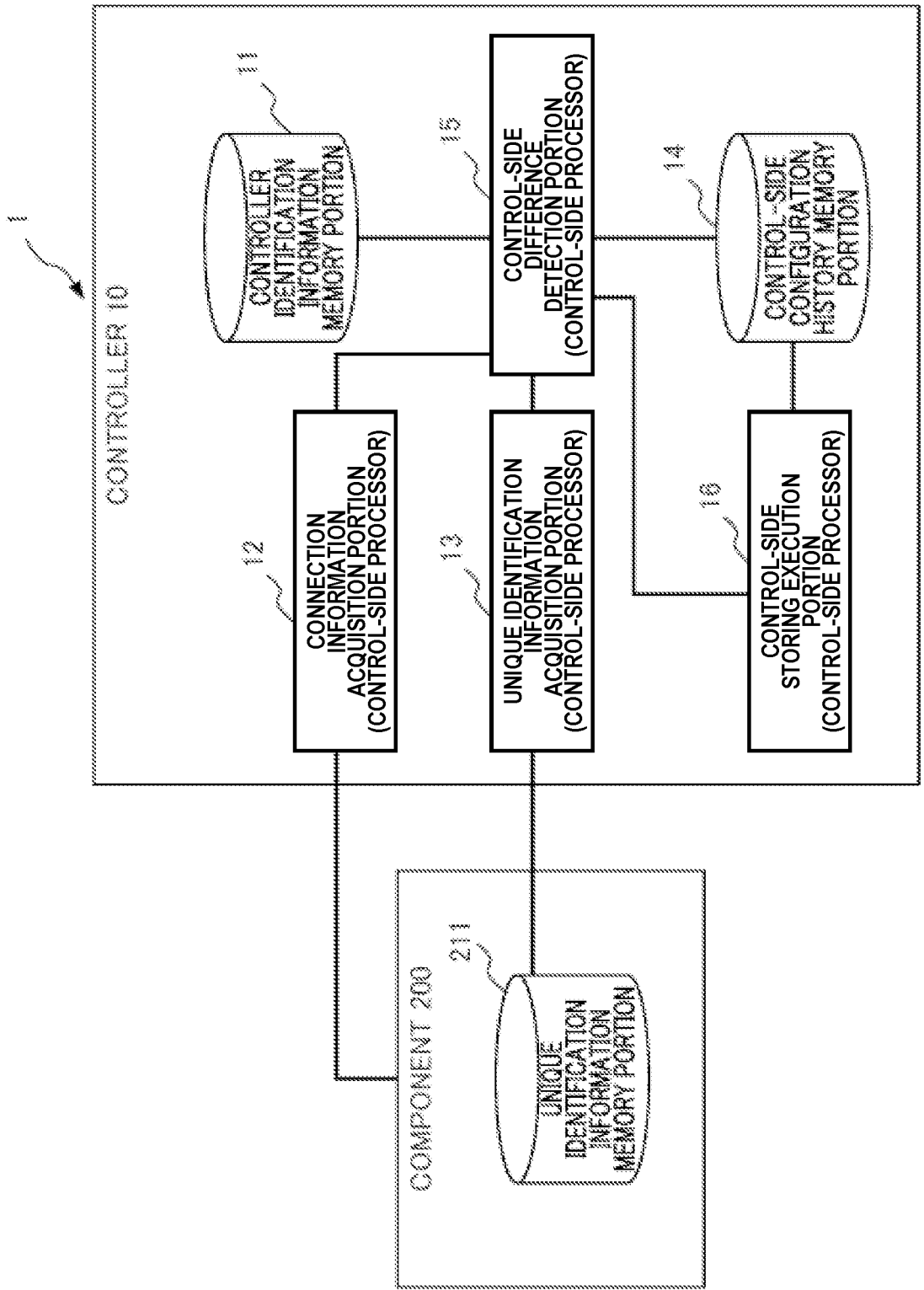
FIG. 12 is a block diagram showing a controller and a configuration of components according to the third embodiment.

As shown in FIG. 11, the industrial machine 1 according to the third embodiment includes the controller 10, the plurality of components 200 connected to the IF1 of the controller 10, the plurality of components 200 connected to the IF2 of the controller 10, and the plurality of components 200 connected to the IF3 of the controller 10. The controller 10 includes a main PCB and a back panel PCB. A CPU PCB, a memory PCB, a communication PCB, and a power supply PCB are mounted to the main PCB. CNC software A and CNC software B are installed in the memory PCB. An additional function PCB is mounted to the back panel PCB.

A servo amplifier 203 and a pulse coder 205 are connected to the IF1 in two rows in this order. The servo amplifier 203 and the pulse coder 205 are connected to the IF2 in a single row in this order. Furthermore, a spindle amplifier 206 is connected to the IF2. A spindle motor 207 and a spindle sensor 208 are connected to the spindle amplifier 206. A sensor 201 and an I/O 202 are respectively connected to the IF3 directly.

The servo amplifier 203 includes an IF PCB and a drive PCB. The pulse coder 205 includes a PC PCB. The pulse coder 205 is incorporated into the servo motor 204, and stores unique identification information of both the pulse coder 205 and the servo motor 204. The spindle amplifier 206 includes the IF PCB and the drive PCB. SP software is installed in the IF PCB of the spindle amplifier 206. The spindle sensor 208 includes a sensor PCB. The sensor 201 includes the sensor PCB. The I/O 202 includes an I/O PCB. In each PCB, unique identification information (individual identification number, etc.) of the PCB itself and the component in which the PCB is provided may be stored.

As shown in FIG. 12, in the industrial machine 1 according to the third embodiment, the controller 10 includes a controller identification information memory portion 11, a connection information acquisition portion 12, a unique identification information acquisition portion 13, a control-side configuration history memory portion 14, a control-side difference detection portion 15, and a control-side storing execution portion 16. The component 200 includes a unique identification information memory portion 211. In the controller 10 according to the third embodiment, the connection information acquisition portion 12, the unique identification information acquisition portion 13, the control-side difference detection portion 15, and the control-side storing execution portion 16 are realized by the CPU mounted to the CPU PCB of the controller 10 shown in FIG. 11. In the controller 10 according to the third embodiment, the controller identification information memory portion 11 and the control-side configuration history memory portion 14 are realized by memory mounted to the memory PCB of the controller 10 shown in FIG. 11.

The controller identification information memory portion 11 stores controller identification information including information of software applied to the controller 10. The controller identification information includes an individual identification number and a model type of the controller 10 itself, and further includes individual identification numbers of various types of PCBs constituting the controller 10 and information of various types of software (a series, a version number, etc.) installed in the controller 10.

The control-side configuration history memory portion 14 stores configuration histories that each summarize, in terms of an acquisition timing, the controller identification information stored in the controller identification information memory portion 11 and the unique identification information previously acquired by the unique identification information acquisition portion 13. Examples of the controller identification information include an individual identification number of a PCB other than the memory PCB, a series and a version number of the software constituting the controller 10, etc., and the information may be changed.

The control-side storing execution portion 16 summarizes the controller identification information stored in the controller identification information memory portion 11 and unique identification information newly acquired by the unique identification information acquisition portion 13 into a new configuration history. The control-side storing execution portion 16 then causes the control-side configuration history memory portion 14 to store the new configuration history, separately from the configuration histories that have already been stored. It should be noted that, since the component 200 does not include the component-side configuration history memory portion 212 in the industrial machine 1 according to the third embodiment, the control-side storing execution portion 16 causes the control-side configuration history memory portion 14 to store the configuration history.

In the industrial machine 1 according to the third embodiment, the new configuration history may include controller identification information of only the controller 10 or unique identification information of only the component 200 that has a difference in configuration between the controller identification information stored in the controller identification information memory portion 11 and the unique identification information newly acquired by the unique identification information acquisition portion 13, and the controller identification information and the unique identification information that have been stored and are included in the configuration history. Furthermore, the new configuration history may include both the controller identification information of the controller 10 and the unique identification information of the component 200 that have the difference in configuration.

The unique identification information of the component 200 includes an individual identification number, a model type, information of software (a series, a version number, etc.), a maximum allowable current value, etc., of the component 200, and further includes individual identification numbers of various types of PCBs constituting the component 200 and information of various types of software (a series, a version number, etc.) installed in the component 200.

It should be noted that FIGS. 13A, 13B, and 13C show a (a series of) new configuration history stored in the controller 10 in a divided manner. In other words, the configuration history shown in FIG. 13A is followed by the configuration history shown in FIG. 13B, and the configuration history shown in FIG. 13B is followed by the configuration history shown in FIG. 13C. In the FIGS. 13A, 13B, and 13*c*, L-shaped symbols each indicate physical hierarchy of connection of the component.

The configuration history shown in FIGS. 13A, 13B, and 13C includes the configuration history that has been already stored and a newly acquired configuration history (new configuration history). The new configuration history is, for example, information which includes information of a component that has been changed from the original component and also the acquired date. Furthermore, the configuration history includes information in which a name of the component (PCB and software), an individual identification number, and a model type (or anything that can identify the specification such as a module name) are arranged in sequence in a table format.

In the configuration history shown in FIGS. 13A, 13B, and 13C, the configuration history shown from the top of FIG. 13A to the second row of FIG. 13C indicates information of the original configuration, and therefore, indicates information of the overall configuration. The configuration history shown in the third row and below of FIG. 13C indicates the change history from the original configuration. For example, a certain recorded date and time indicate that the drive PCB of the servo amplifier #1 connected to the Interface 1 has been replaced with another individual (a different individual identification number is given. The model type may differ or may be the same). Furthermore, another recorded date and time indicate that a series or a version number of the CNC software A of the CNC has been updated (the model type may differ or may be the same). Furthermore, yet another recorded date and time indicate that a sensor has been added to the Interface 3.

Furthermore, the individual identification numbers for the controller 10, the servo amplifier 203, and the spindle amplifier 206 are given to ones in which a PCB to be configured, a housing (not shown), a cable (not shown), etc. are assembled. In the present embodiment, the individual identification number is an individual identification number stored in any PCB included in each configuration, or is generated from the stored individual identification number. It should be noted that the individual identification number may be a number different from the individual identification number stored in the PCB included in each configuration.

The industrial machine 1, the controller 10, and the components 200 according to the third embodiment, as described above, lead to the following effects.

(5) The controller 10 according to the third embodiment is a controller that controls components 200, and the controller 10 includes: a controller identification information memory portion 11 that stores identification information of the controller itself as controller identification information; a unique identification information acquisition portion 13 that newly acquires unique identification information of the components 200 from each of the components 200 as unique identification information; a control-side configuration history memory portion 14 that, stores configuration histories that each summarize, in terms of an acquisition timing, controller identification information stored in the controller identification information memory portion 11 and unique identification information previously acquired by the unique identification information acquisition portion 13; and a control-side storing execution portion 16 that summarizes controller identification information stored in the controller identification information memory portion 11 and unique identification information newly acquired by the unique identification information acquisition portion 13 into a new configuration history, and causes the control-side configuration history memory portion 14 to store the new configuration history, separately from the configuration histories that have already been stored. With such a configuration, it is unnecessary for the component 200 to include a memory portion for the configuration history, and thus, it is possible to store unique identification information of both the controller 10 and the component 200 on the controller 10 side. Therefore, it is possible to simplify the configuration of the component 200.

The industrial machine, the controller, and the components according to the third embodiment of the present disclosure have been described above. However, the present disclosure is not limited to the embodiments described above. It is possible to appropriately change the embodiments. It should be noted that the description relating to the change in configuration mentioned above is also applied to the third embodiment. Conversely, the description relating to the third embodiment is also applied to the descriptions relating to the other embodiments and modification examples.

For example, in the third embodiment above, the control-side configuration history memory portion 14 stores the identification information in the printed circuit board units. However, the present invention is not limited to this. For example, the control-side configuration history memory portion 14 may store the identification information in the component 200 units.

Furthermore, in the third embodiment above, the control-side storing execution portion 16 establishes the difference in configuration as a new configuration history. However, the present invention is not limited to this. The control-side storing execution portion 16, for example, may establish identification information of the controller 10 and the component 200 which are acquired periodically as a new configuration history. Furthermore, in the third embodiment above, the controller 10 includes the three interfaces. However, the present invention is not limited to this. The number and type of the component 200 to be connected to the interface of the controller 10 are not limited to the exemplified ones.

The pulse coder 205 and the servo motor 204 may respectively store its own unique identification information. In such a case, the servo amplifier 203, the servo motor 204, and the pulse coder 205 may be connected to the interface in this order. The spindle sensor 208 may be incorporated into the spindle motor 207. In such a case, the spindle sensor 208 may store the unique identification information of both the spindle sensor 208 and the spindle motor 207.

EXPLANATION OF REFERENCE NUMERALS

1 Industrial machine
10 Controller
11 Controller identification information memory portion
12 Connection information acquisition portion
13 Unique identification information acquisition portion
14 Control-side configuration history memory portion
15 Control-side difference detection portion
16 control-side storing execution portion
200 Component
211 unique identification information memory portion
212 Component-side configuration history memory portion
213 Component-side difference detection portion
214 Component-side storing execution portion

What is claimed is:

1. A component assembled in an industrial machine together with a controller and other components, the component comprising:
   a unique identification information memory that stores, as unique identification information, identification information of the component, the identification information being providable to the controller; and
   a component-side configuration history memory that stores configuration histories that each summarize, in terms of an acquisition timing from the controller, the stored unique identification information of the component, controller identification information of a past controller that was part of the industrial machine together with the component before the acquisition timing, and unique identification information of past components that were part of the industrial machine together with the component before the acquisition timing.

2. A controller that is coupled to the component according to claim 1, and that controls the component, the controller comprising:
   a controller identification information memory that stores, as controller identification information, identification information of the controller itself;
   a control-side processor that newly acquires identification information that is unique to the component, as unique identification information, from the component; and
   a control-side configuration history memory that stores configuration histories that each summarize, in terms of an acquisition timing, previously acquired unique identification information, wherein
   the control-side processor detects whether there is a difference in the configuration between the unique identification information that is acquired newly and the unique identification information included in each of the configuration histories that are unique, and
   the control-side processor summarizes, when a difference is detected, the controller identification information and the newly acquired unique identification information into a new configuration history, and that causes the control-side configuration history memory to store the new configuration history, separately from the configuration histories that have already been stored.

3. A component assembled in an industrial machine together with a controller and other components, the component comprising:
   a unique identification information memory that stores, as unique identification information, identification information of the component, the identification information being providable to the controller;
   a component-side configuration history memory that stores configuration histories that each summarize, in terms of an acquisition timing, the stored unique identification information of the component, controller identification information of a past controller that was part of the industrial machine together with the component before the acquisition timing, and unique identification information of past components that were part of the industrial machine together with the component before the acquisition timing; and a component-side processor that detects whether there is a difference in terms of configuration between controller identification information and unique identification information included in a latest configuration history stored in the component-side configuration history memory and controller identification information and unique identification information included in a latest configuration history stored in the controller that controls the component, wherein the component-side processor causes, when a difference is detected, the component-side configuration history memory to store a new configuration history, separately from the configuration histories that have already been stored.

4. A controller that is coupled to the component according to claim 3, and that controls the component, the controller comprising:

a controller identification information memory that stores, as controller identification information, identification information of the controller itself;

a control-side processor that newly acquires identification information that is unique to the components, as unique identification information, from the component; and a control-side configuration history memory that stores configuration histories that each summarize, in terms of an acquisition timing, previously acquired unique identification information, wherein the control-side processor summarizes the controller identification information and the newly acquired unique identification information into a new configuration history, and that causes the control-side configuration history memory to store the new configuration history, separately from the configuration histories that have already been stored.

5. The component according to claim 1, wherein the unique identification information memory stores the unique identification information that includes information of software applied to the component.

6. The component according to claim 3, wherein the unique identification information memory stores the unique identification information that includes information of software applied to the component.

7. The controller according to claim 2, wherein the control-side processor acquires connection information relating to a connection state among the controller and the component, and causes the control-side configuration history memory and the component-side configuration history memory to store a new configuration history including the acquired connection information.

8. The controller according to claim 4, wherein the control-side processor acquires connection information relating to a connection state among the controller and the component, and causes the control-side configuration history memory and the component-side configuration history memory to store a new configuration history including the acquired connection information.

9. A controller that controls a component, the controller comprising:

a controller identification information memory that stores identification information of the controller itself as controller identification information;

a control-side processor that newly acquires unique identification information of the component from the component as unique identification information; and a control-side configuration history memory that stores configuration histories that each summarize, in terms of an acquisition timing, controller identification information stored in the controller identification information memory and unique identification information previously acquired by the control-side processor, wherein the control-side processor summarizes controller identification information stored in the controller identification information memory and the newly acquired unique identification information into a new configuration history, and causes the control-side configuration history memory to store the new configuration history, separately from the configuration histories that have already been stored.

10. The controller according to claim 9, wherein the new configuration history includes controller identification information of only a controller or unique identification information of only a component that has a difference in configuration between the controller identification information stored in the controller identification information memory and the unique identification information newly acquired by the control-side processor, and the controller identification information and the unique identification information that have already been stored are included in the configuration history.

11. The controller according to claim 2, wherein the controller identification information memory stores the controller identification information including information of software applied to the controller.

12. The controller according to claim 4, wherein the controller identification information memory stores the controller identification information including information of software applied to the controller.

13. The controller according to claim 9, wherein the controller identification information memory stores the controller identification information including information of software applied to the controller.

14. The controller according to claim 2, wherein the control-side processor acquires the unique identification information including information of software applied to the component.

15. The controller according to claim 4, wherein the control-side processor acquires the unique identification information including information of software applied to the component.

16. The controller according to claim 9, wherein the control-side processor acquires the unique identification information including information of software applied to the component.

17. The component according to claim 1, wherein the configuration histories each indicates the unique identification information of the component, the controller identification information of the controller, and the unique identification information of the other components at each acquisition timing.

18. The component according to claim 3, wherein the configuration histories each indicates the unique identification information of the component, the controller identification information of the controller, and the unique identification information of the other components at each acquisition timing.

19. The controller according to claim 9, wherein the configuration histories each indicates the controller identification information, and the previously acquired unique identification information at each acquisition timing.

20. The component according to claim 1, wherein the component-side configuration history memory cumulatively stores a transition of the configuration histories.

21. The component according to claim 3, wherein the component-side configuration history memory cumulatively stores a transition of the configuration histories.

22. The controller according to claim 9, wherein the control-side configuration history memory cumulatively stores a transition of the configuration histories.

* * * * *